United States Patent [19]

Jenkner

[11] Patent Number: 4,738,345
[45] Date of Patent: Apr. 19, 1988

[54] ROLLER ARRANGEMENT FOR PRODUCING A ROLLER TABLE FOR TRANSPORTATION OF, IN PARTICULAR, PLATE-SHAPED WORKPIECES

[76] Inventor: Erwin Jenkner, Lindenstrasse 13, D-7261 Gechingen, Fed. Rep. of Germany

[21] Appl. No.: 917,099

[22] Filed: Oct. 8, 1986

Related U.S. Application Data

[62] Division of Ser. No. 677,241, Dec. 3, 1984, abandoned.

[30] Foreign Application Priority Data

Jan. 11, 1984 [DE] Fed. Rep. of Germany ....... 3400686

[51] Int. Cl.$^4$ ...................... B65G 13/11; B65G 39/00
[52] U.S. Cl. .................................. 193/35 C; 108/13; 193/35 J; 269/289 MR
[58] Field of Search ............ 269/88, 289 MR; 108/13, 108/62, 57.1; 193/35 R, 35 C, 35 J, 37

[56] References Cited

U.S. PATENT DOCUMENTS

| | | | |
|---|---|---|---|
| 2,990,929 | 7/1961 | Attwood | 193/35 R |
| 3,343,204 | 9/1967 | Ford | 193/37 X |
| 3,509,978 | 5/1970 | Bedford | 193/35 R |
| 3,763,980 | 10/1973 | Vom Stein et al. | 193/35 R |

FOREIGN PATENT DOCUMENTS

| | | | |
|---|---|---|---|
| 2320493 | 4/1977 | France | 193/35 J |
| 2366190 | 6/1978 | France | 193/35 R |
| 1088519 | 10/1967 | United Kingdom | 193/35 R |
| 2029354 | 3/1980 | United Kingdom | 193/35 R |

Primary Examiner—Andres Kashnikow
Assistant Examiner—Mary Beth O. Jones
Attorney, Agent, or Firm—Dick and Harris

[57] ABSTRACT

The invention relates to an improved roller table arrangement for the transportation, in a horizontal plane, of typically plate-shaped workpieces. The present invention provides a roller table of the form of rollers located on carrier rails, in which rolling transport may be accomplished either parallel to, or transversely to, the carrier rails, the aforesaid transportation being achieved through the use of interchangeable roller receiving means. The invention further provides a means by which uniform elevation of the rollers with respect to the carrier rails is accomplished in spite of the presence of swarf or other material debris upon the carrier rails. The present invention further provides for the selective conversion from roller table to workpiece support table through the use of support strips which may be placed upon the carrier rails in lieu of the roller receiving means.

34 Claims, 6 Drawing Sheets

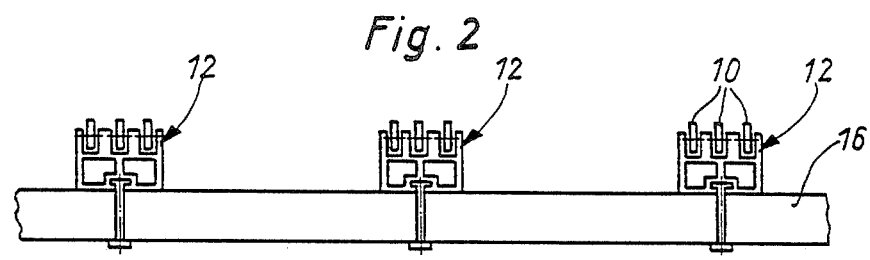
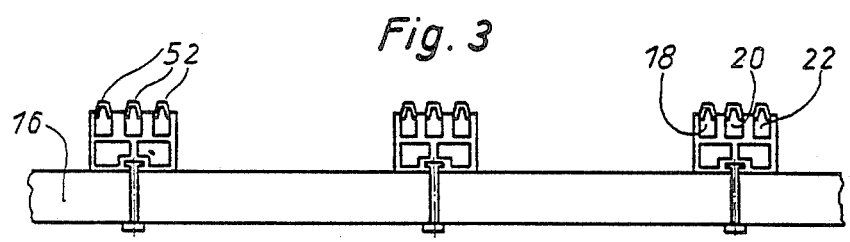

ROLLER ARRANGEMENT FOR PRODUCING A ROLLER TABLE FOR TRANSPORTATION OF, IN PARTICULAR, PLATE-SHAPED WORKPIECES

The present invention is a divisional application of the prior pending parent application, Ser. No. 677,241, filed 12/3/84, now abandoned.

The invention relates to a roller arrangement for producing a roller table for transportation of, in particular, plate-shaped workpieces, comprising a plurality of rollers which are combined to form at least one row and are rotatably mounted on bearing shafts held on a support transversely to the direction of transportation.

The roller arrangement of known roller tables, as commonly used in wood-working machines, is formed by roller bearing shafts being arranged on strip-type webs disposed in laterally spaced, parallel relationship to one another, along one longitudinal side of the latter, at equal distances from one another and in a common horizontal plane.

To this end, these roller bearing shafts are welded at their one end to the pertinent longitudinal side of the webs. One roller, respectively, is then placed onto the bearing shafts and axially secured with a snap ring.

The bearing shafts must be positioned very precisely when they are being welded to the webs so as to ensure that the workpieces are carried along by all of the rollers during transportation.

When the bearing shafts have been welded and the rollers mounted, the webs still have to be aligned and secured in spaced, parallel relationship to one another on a support frame.

The object underlying the invention is, therefore, to indicate a roller arrangement for producing a roller table which may be constructed in a simpler and quicker manner with the precision required for the positioning of their roller bearing shafts.

Accordingly, the roller arrangement according to the invention may be produced by merely appropriately putting together single units. The roller bearing shafts may thus be inserted into the bearing bore of the rollers to be mounted thereon and together with the roller placed in between the bearing shaft receiving members to be inserted in pairs into the support groove or held therein, with all of the roller bearings shafts finally being precisely located at the same installation height and, consequently, each of the rollers performing its carrying function.

In this case, the unit assembly principle used in accordance with the invention enables rollers to be arranged in rows of any length, and in the event that rollers should need to be replaced, this may be done by simply exchanging the pertinent roller bearing shafts.

Here, the roller arrangement may be constructed so that, in this case, the rollers merely protrude with a circumferential portion from the top side of the support.

In one embodiment of the invention, it is possible to simply insert the roller bearing shaft from above into the bearing shaft recesses of the bearing shaft receiving members. The latter may, for example, be pushed for part of their length into the groove of the support, from one of its end faces, and after insertion of the roller bearing shaft provided with a roller into its recesses, may then be pushed into the support groove throughout their entire length.

The bearing shaft receiving members which are oppositely arranged to accommodate a roller bearing shaft may be advantageously combined to form one component by the positively engageable U-shaped legs of the bearing shaft receiving members ensuring in a simple manner that the latter are unable to be mutually displaced in the longitudinal direction during insertion into the support groove.

A desired axial spacing between the rollers may also be maintained provided that all of the successively arranged bearing shaft receiving members are of the same length.

If the support is to be provided with several rows of rollers located alongside one another, rollers of the individual rows may be arranged in a simple manner in staggered relationship to one another.

The groove(s) of the support accommodating the bearing shaft receiving members may be advantageously designed with a T-shaped cross-section or a U-shaped cross-section.

The roller arrangement may also be constructed with the portion of the bearing shaft receiving members associated with one another in pairs which accommodates the roller bearing shaft being located outside the support groove and the roller bearing shaft extending parallel to the longitudinal axis of the support groove.

In this case, the direction of transportation of the roller arrangement is oriented perpendicularly to the longitudinal direction of the support groove.

This roller arrangement also advantageously enables a structural variant wherein several rollers may be mounted between the bearing shaft receiving members. This is, however, also possible in other aforementioned embodiments of the invention.

In a preferred embodiment of the invention, the support is in the form of a rail which is easy to handle and may be advantageously mounted.

A further advantage of the inventive construction is obtained by the support grooves accommodating the bearing shaft receiving members being of T-shaped cross-section. In this case, instead of the bearing shaft receiving members, appropriate strips, for example, of reverse V-shaped cross-section may be clamped or snapped into the grooves in such a way that they protrude beyond the pertinent top side of the support by a certain amount, which enables modification of a roller table into a workpiece supporting table provided with supporting strips.

Further features and details of the invention are explained in the following description of embodiments of roller arrangements shown in the drawings.

FIG. 2 is a simplified cross-section of the roller table taken along line 2—2 of FIG. 1;

FIG. 3 is an illustration similar to FIG. 2 of a possible modification of the roller table into a workpiece table comprising support strips;

Figure 1:
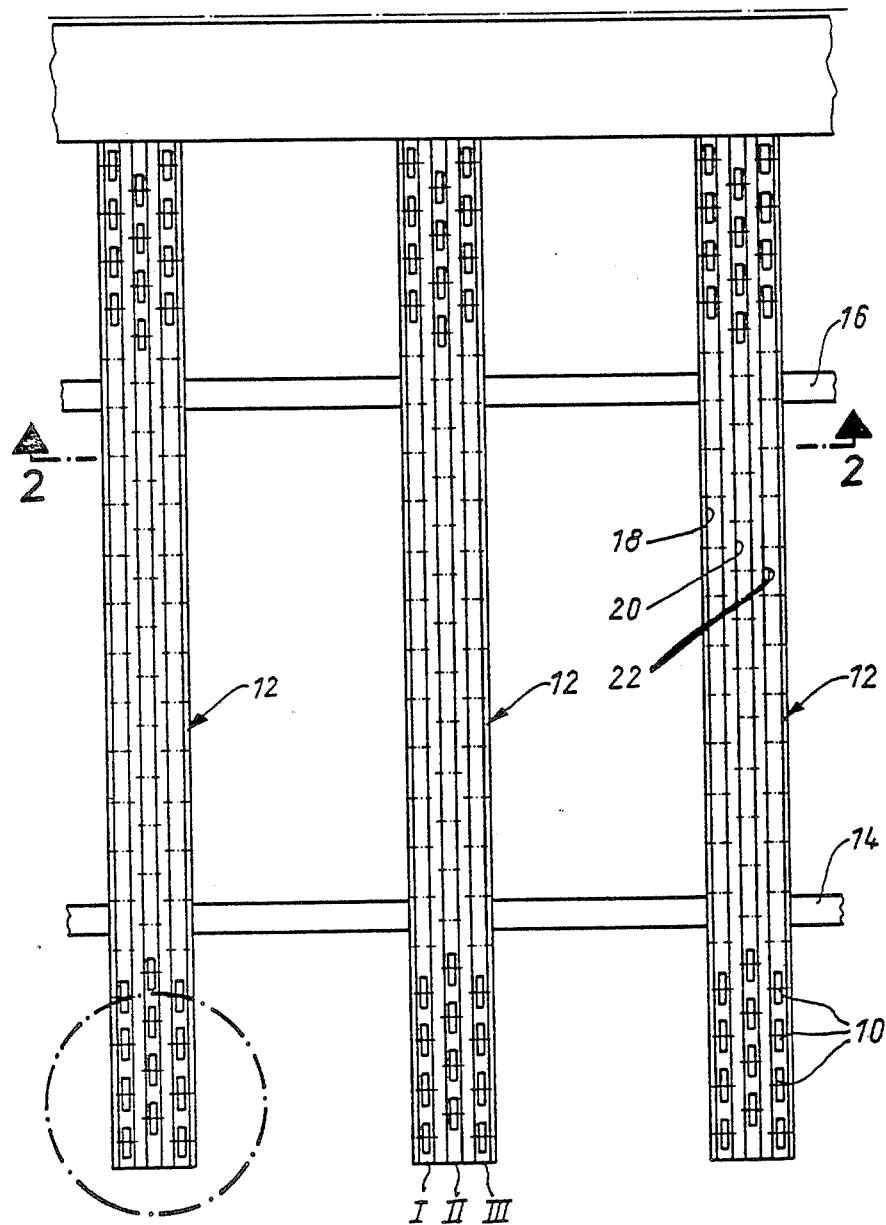
FIG. 1 is a simplified top view of part of a roller table comprising roller arrangements in a first inventive embodiment.

The roller table of the present invention comprises one or a plurality of carrier rails 12, three of which are shown in FIG. 1, which carrier rails 12 are provided with rollers 10 and are removably attached to horizontal crossbeams 14, 16.

The rollers 10 of the carrier rails 12 belong to roller arrangements (not shown in FIGS. 1 and 2, shown in FIGS. 4 and 6) provided on the top side of the carrier rails 12, for example, in three parallel rows I, II and III.

The carrier rails comprise for each roller arrangement one or, as shown, a plurality of grooves 18, 20, 22, accessible from above, extending in the longitudinal direction of the rail and accommodating the roller arrangement bearing components for mounting the rollers 10.

Figure 7:
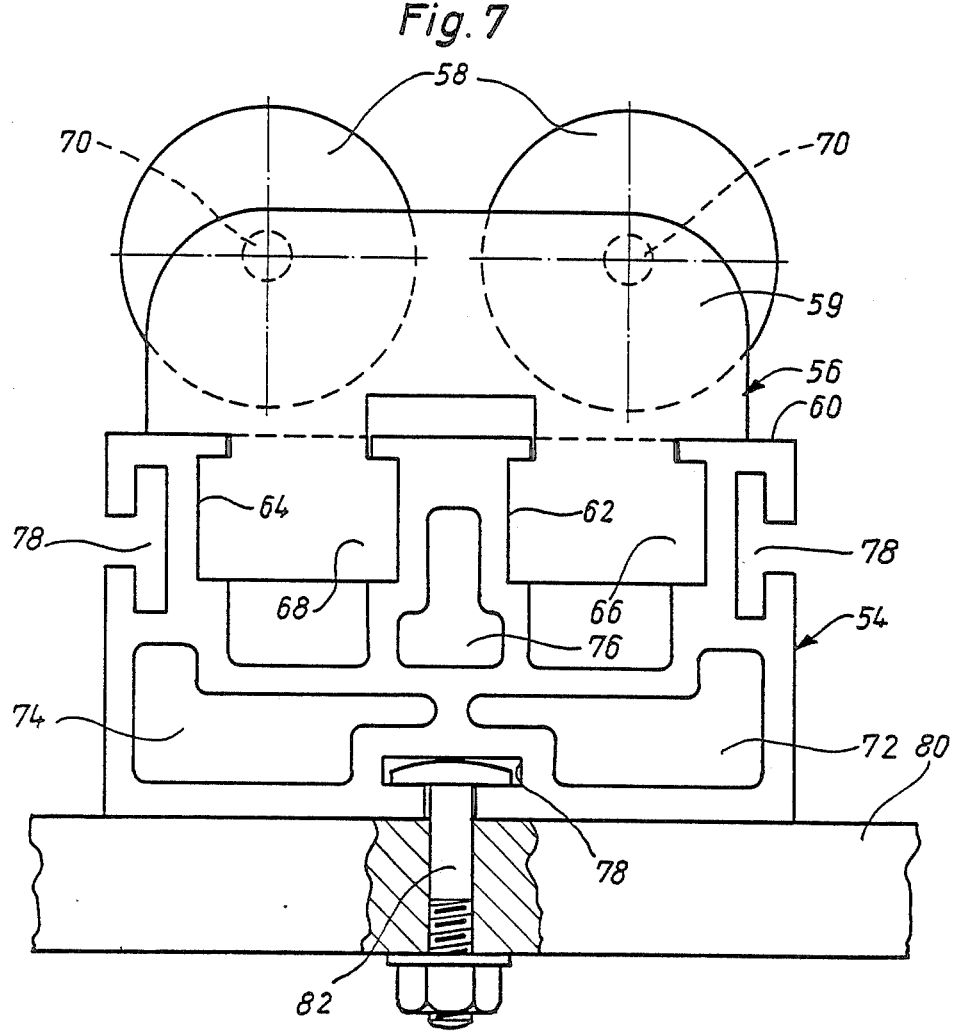
FIG. 7 is a front view of only one support provided with rollers in a second embodiment of an inventive roller arrangement.

The grooves 18 to 22 are preferably of T-shaped cross-section similar to the T-shaped grooves 62, 64 of the support rail 54 in FIG. 7.

The bearing components required for mounting the individual rollers 10 consist per roller of two U-shaped bearing shaft receiving members 24 and 26, which are to be arranged in opposite relationship to one another in the grooves 18 to 22 and whose U-shaped legs face each other when they are inserted into the groove. The transverse dimension of the U-shaped legs is chosen such that both bearing shaft receiving members 24, 26 rest with their flat outside surfaces against the groove walls when inserted into the groove. Their height corresponds substantially to the clear height of the T-shaped groove accommodating them.

Figure 6:
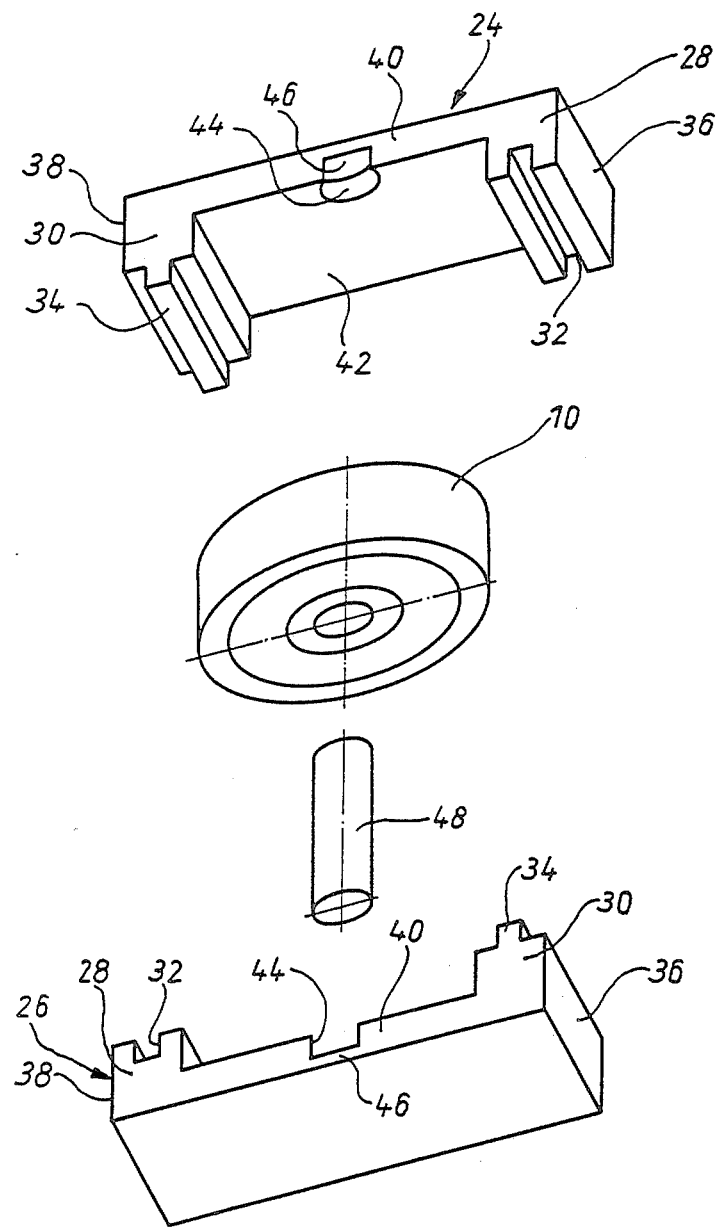
FIG. 6 is an exploded illustration of the roller arrangement components constituting a roller bearing.

As is apparent from FIG. 6, the two bearing shaft receiving members 24, 26 are to be positively engaged with their U-shaped legs 28, 30, so that they cannot be displaced relatively to each other in their longitudinal direction, but are insertable together as a component into a carrier rail groove. For positive connection, the one U-shaped leg 28 comprises an engagement slot 32, and the other U-shaped leg 30 a tab 34, so that the members 32, 34 are engageable in a slot and tab type manner. Other kinds of connection are possible.

Figure 4:
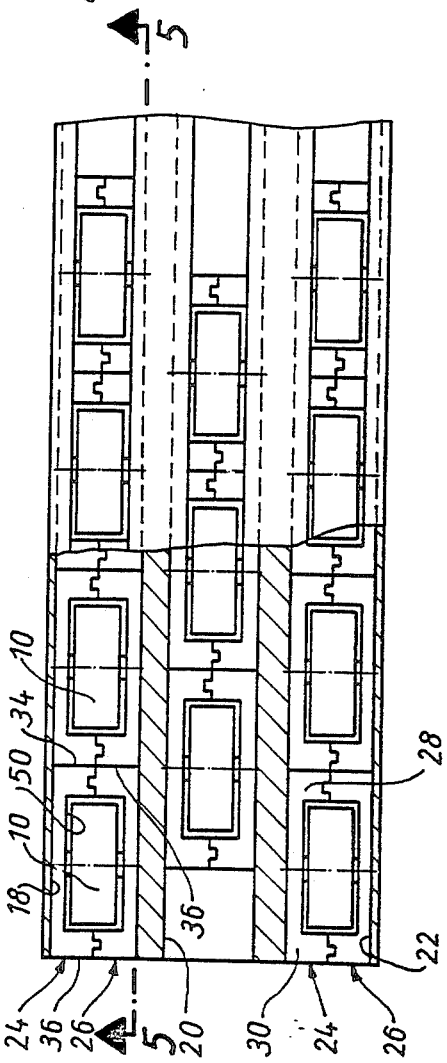
FIG. 4 is an enlarged illustration of a section indicated in FIG. 1 by a dot-and-dash circle, wherein the support rail is broken up along part of its length.

When the two bearing shaft receiving members 24, 26 are in mutual engagement, their end surfaces 36 and 38 are flush, as is apparent from FIG. 4.

In the area of the upper edge 40 of the connecting span 42 of the bearing shaft receiving members joining the two U-shaped legs 28 and 30 to one another there is arranged in its longitudinal center a recess 44 which is accessible from above and delimited in the direction of the groove wall by a bottom 46. Insertable with its ends into these recesses 44 is a bearing shaft 48 accommodating a roller 10 which is then located within a space 50 (FIG. 4) formed by the U-shape of the two bearing shaft receiving members 24, 26.

Figure 5:
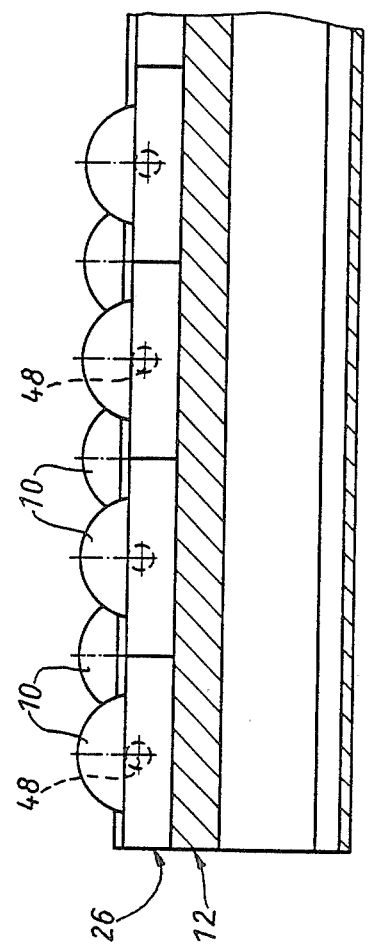
FIG. 5 is a longitudinal sectional view of the support rail section shown in FIG. 4, taken along line 5—5 of FIG. 4.

The recesses 44 for accommodation of the bearing shaft 48 are arranged on the bearing shaft receiving members 24 and 26 at such a height that the roller 10, as shown in FIG. 5, protrudes with a circumferential portion beyond the top side of the carrier rail 12. It can readily be seen that if the span 42 is extended, a plurality of recesses 44, with associated axles 48 and rollers 10, might be provided theron.

In order to produce the roller arrangements in rows on the carrier rails 12, a pair of bearing shaft receiving members 24 and 26 per roller 10 is put together in the manner described, in accordance with FIG. 6, and the bearing shaft 48 provided with a roller 10 is inserted into their recesses 44, whereupon the thus formed component is pushed into the pertinent T-shaped groove.

As is apparent from FIG. 4, one bearing unit adjoins the other, with their end faces being contiguous, and all of the rollers having the same axial spacing from one another.

For arrangement of rollers 10 in staggered relationship to one another in the individual grooves 18 to 22, a spacer which is half the length of the bearing shaft receiving members 24, 26 is first pushed into the pertinent groove, for example, groove 20. When this spacer reaches its position by abutment at the other end of the carrier rail, the roller bearing arrangements inserted into this groove are automatically staggered by the amount of half of the mutual axial spacing of the rollers 10 of the roller bearing arrangements inserted into the neighboring carrier rail groove.

Instead of a T-shaped cross-section, the carrier rail grooves 18 to 22 may also have a U-shaped cross-section. In this case, it is then possible to dispose between the rows of rollers on the carrier rail, strips which partially cover the grooves laterally in order to secure the roller bearing arrangements in the grooves.

Figure 3A:
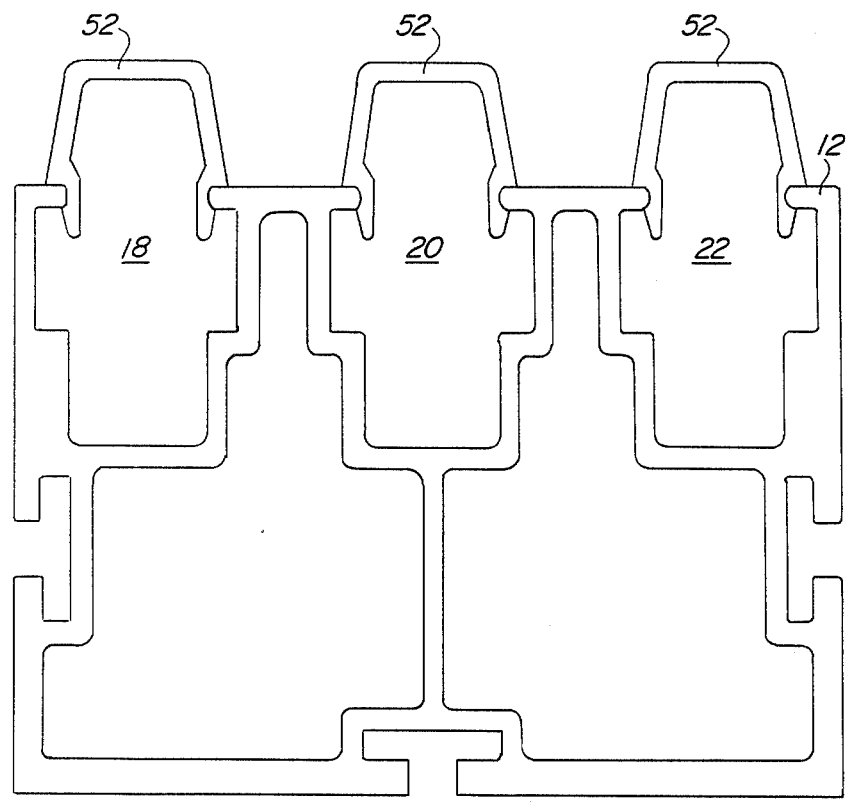
FIG. 3A is an enlarged view of one of the carrier rail cross-sectional views of FIG. 3.

As is apparent from FIG. 3, the above-described accommodation of roller bearing arrangements in T-shaped grooves of the carrier rails 12 has the advantage of enabling modification of a roller table into a workpiece supporting table comprising supporting strips 52. Referring now to FIG. 3A, the roller bearing arrangements are removed from the carrier rail grooves 18 to 22 and inserted into grooves 18 to 22 are support strips 52 having, as seen for example in FIG. 3A, reverse V-shaped cross-section.

While the characteristic feature of the above-described roller arrangements on the carrier rails 12 is that the workpiece is transported in the direction of the carrier rails 12, FIG. 7 depicts a feature of the present invention which provides for the transport of workpieces transversely relative a carrier rail. This is attained by the external receiver bodies associated with one another in pairs, only one of which is to be seen in the front view according to FIG. 7, namely that designated by 56, being located with their portions 59, in which, in this case, for example, two rollers 58 are mounted, above the top side 60 of the support rail 54 and being in positive engagement in two parallel support grooves 62, 64 of T-shaped cross-section with retaining bases 66 and 68 formed on their bottom side.

In this case, the bearing shaft 70 of the rollers 58 is held in circumferentially closed blind hole bores of the external receiver bodies 56.

It is to be recognized that the present invention is not limited to the embodiment shown in FIG. 7. It can be readily perceived that the external receiver body may be provided with a single retaining base (not shown) in which case the carrier rail 54 need not have more than one groove 66 or 68. Similarly, it is readily understood that the external receiver bodies 59 may be configured so as to accommodate an axle or axles of sufficient length to support a plurality of rollers upon each axle (not shown). Finally, it may be readily perceived that the external receiver bodies might be configured as a single piece rather than being divided transversely to the groove.

Various cavities 72, 74, 76 preferably extend through the support rails in their longitudinal direction. The support rails are made of light metal, preferably, aluminum, in the drawing process, and are preferably of rectangular cross-section.

As shown in FIG. 7, they are provided on both of their longitudinal sides and on their bottom side with T-shaped grooves 78 extending in their longitudinal direction, by means of which they can be advantageously secured under tension to corresponding supports. To this end, the carrier rail 54 in FIG. 7 is clamped, for example, on horizontal crossbeams 80 by clamping screws 82 which penetrate the latter throughout the entirety of their height.

It is understood that the above-described roller bearing arrangements to be disposed or secured in the support rail grooves are merely to be regarded as preferred embodiments, the gist of the invention being that roller arrangements for producing a roller table may be put together so as to say in accordance with the unit assembly principle, with the carrier rail construction of the embodiment type shown in FIG. 7 being considered the preferred one, since the drawing process used for their manufacture involves no further metal removal procedures.

What is claimed is:

1. An arrangement for selectively providing either a roller table for the easy transportation of workpieces, especially plate-shaped workpieces, in a horizontal plane, or a workpiece support table for use in a manufacturing process, comprising:
   a support in the form of at least one carrier rail with an upper side, the support having at least one longitudinal groove extending along the length of the carrier rail and the groove opening on the upperside of the rail;
   and means for converting between the roller table and the workpiece support table including oppositely arranged receiving members removably arranged in the groove and having a roller mounted on a shaft disposed transverse to the longitudinal groove with a circumferential portion of the roller protruding above the upper side of the carrier rail;
   external receiver bodies exchangeable for the oppositely arranged receiving members and including at least one lower retaining base insertable into the groove in lieu of the oppositely arranged receiving members, and having at least one roller rotatably supported about a shaft supported by said external receiver body and extending in the direction of the longitudinal groove;
   and at least one support strip exchangeable for the oppositely arranged receiving members and the external receiving bodies, and operatively associated with the longitudinal groove so as to extend in a workpiece supporting position above the upper side of the carrier rail.

2. The invention according to claim 1 wherein the receiving members are insertable or slidable in their entirety into the groove of the carrier rail and hole the roller between them.

3. The invention according to claim 2 wherein the receiving members arranged in the groove are of U-shaped configuration as viewed from above with oppositely arranged U-shaped legs contiguous with one another having recesses centrally disposed therebetween accommodating the respective ends of the roller shaft arranged in the center of the axle receiving members between the U-shaped legs.

4. The invention according to claim 3 wherein the recesses of the receivign members, which accommodate the roller shaft ends, are open in an upward direction.

5. The invention according to claim 4, wherein each of the recesses has a bottom.

6. The invention according to claim 3, wherein at least one pair of the contiguous legs of the oppositely arranged receiving members engage positively in a slot-and-tab type manner, with the contiguous U-shaped legs being flush with one another at their end faces.

7. The invention according to claim 2, wherein a plurality of pairs of the oppositely arranged receiving members are inserted in their entirety into the groove of the carrier rail and adjoin one another without spacing therebetween.

8. The invention according to claim 2, wherein the carrier rail has at least two grooves arranged in spaced parallel relationship to one another which accommodate the receiving members; and the receiving members of adjacent support grooves having equal lengths and are arranged therein in staggered relationship to one another by the amount of half their length.

9. The invention according to claim 1, wherein at least one groove of the carrier rail is of T-shaped cross-section.

10. The invention according to claim 1 wherein the groove of the support is of U-shaped cross-section.

11. The invention according to claim 1 wherein the external receiver bodies are held with two bottom, latterally spaced retaining bases in adjacent support grooves, and at least two rollers are mounted between the external receiver bodies.

12. The invention according to claim 1, wherein the support is a metal rail of drawn aluminum.

13. The invention according to claim 12, wherein the profile of the metal rail is of rectangular cross-section, with cavities extending therethrough, and is provided with at leat one T-shaped groove which extends along the metal rail, opening in a downward direction.

14. The invention according to claim 1, wherein the oppositely arranged receiving members each have a U-shaped configuration as viewed from above the carrier rail, with opposing legs abutting each other, and the shaft being supported at its ends on the receiving members centrally of the legs.

15. The invention according to claim 1, wherein the external receiver bodies are divided transversely to the longitudinal groove with the roller arranged on the shaft between adjacent external receiver bodies.

16. The invention according to claim 1, wherein the longitudinal groove has a T-shaped cross-section defining lateral wall portions upon which the retaining base rests.

17. The invention according to claim 1, wherein the carrier rail is provided with two longitudinal grooves with the retaining base configured to be inserted in both grooves, and the external receiving bodies are provided with two rollers above each groove.

18. Table module which can be assembled into a roller table for transporting workpieces, especially plate-shaped workpieces, comprising:
   a support in the form of at least one carrier rail with an upper side;
   the support having at least one longitudinal groove along the length of the carrier rail and the groove opening on the upper side of the rail;

oppositely arranged receiving members removably arranged in the groove and having a roller mounted on a shaft disposed transverse to the longitudinal groove with a circumferential portion of the roller protruding above the upper side of the carrier rail; and and external receiving bodies exchangeable for the oppositely arranged receiving members comprising a lower retaining base insertable into the groove in lieu of the oppositely arranged receiving members and having at least one roller rotatably disposed about a shaft supported by said external receiver bodies and extending in the direction of the longitudinal groove.

19. Table module according to claim 18, wherein means are provided for converting between the roller table and a workpiece support table, including at least one support strip exchangeable for the oppositely arranged receiving members and the external receiver bodies, and operatively associated with the longitudinal groove so as to extend in a workpiece supporting position above the upper side of the carrier rail.

20. Arrangement for selectively providing alternatively either a roller table for easy transportation, in a horizontal plane, of typically plate-shaped workpieces, or a workpiece support table, said arrangement comprising in cooperative combination:
a support in the form of at least one carrier rail, said carrier rail having a longitudinal dimension and two ends;
at least one groove disposed longitudinally upon said carrier rail, said groove further having an opening extending longitudinally upon an upper side of said carrier rail, said groove further having an opening upon at least one end of said carrier rail;
first roller means, selectively and removably disposed within said groove so as to provide rolling transport of workpieces in a direction parallel to said carrier rail longitudinal dimension;
second roller means, selectively and removably disposed within said groove so as to provide rolling transport of workpieces in a direction transverse to said carrier rail longitudinal dimension;
workpiece support means selectively and removably insertable within said groove to provide a workpiece support table; and
said first roller means, said second roller means, and said workpiece support means being interchangeable.

21. The invention according to claim 20 wherein said first roller means comprises:
at least one pair of oppositely engaged receiving members, each receiving member being of a U-shaped configuration, as viewed from above and having two oppositely arranged legs so as to provide, when two receiving members are paired, that the legs of one receiving member contiguously abut those of the other, said pair of receiving members having a width of a selected amount;
at least one shaft, having two ends, said shaft ends being disposed supportably within recesses in the receiving members,
said shaft further extending transversely to said carrier rail; and
at least one roller rotatably supported by said shaft, a peripheral portion of said roller extending upwardly beyond the upper side of said carrier rail.

22. The invention according to claim 21 wherein said apparatus further comprises:
said groove having an interior width less than that of said opening upon said upper side of said carrier rail and said groove further having an interior depth of a selected distance; and
said paired receiving members having a paired width and a height sufficiently less, respectively, than the interior width and interior depth of said groove so as to permit said paired receiving members to be slidably inserted into said groove only via said end opening, said insertion being a snug, nonbinding fit.

23. The invention according to claim 22 wherein at least one pair of the contiguously abutting legs are provided with positively engaging means to prevent relative horizontal motion between the paired receiving members.

24. The invention according to claim 23 wherein said positively engaging means is a slot-and-tab combination.

25. The invention according to claim 24 wherein at least two pairs of receiving members are disposed in said groove, in abutting relation to one another.

26. The invention according to claim 21 wherein a plurality of pairs of receiving members are disposed within said grooves and wherein a spacing means is disposed in at least one groove so as to provide that the pairs of receiving members disposed in that groove are in a staggered relationship to those pairs disposed in an adjacent groove.

27. The invention according to claim 20 wherein said second roller means comprises:
an external receiver body having a retainer base projecting downwardly therefrom and connected therewith by a web, said retaining base slidably fitting within said groove;
at least one shaft supported by said external receiver body, said shaft extending parallel to said groove;
at least one roller rotatably supported by said shaft;
said roller being supported, in its entirety, above the upper side of said carrier rail; and
a peripheral portion of said roller protruding above said external receiver body.

28. The invention according to claim 27 wherein said apparatus further comprises:
each groove having an interior width less than that of said opening upon said upper side carrier rail, each groove further having an interior depth of a selected distance; and
each retaining base having a width and a height sufficiently less, respectively, than that of said groove interior height and interior width, and each web having a width sufficiently less than that of said opening in the upper side of said carrier rail, so as to permit each retaining base to be slidably inserted into said groove only via said end opening, each retaining base having a snug, nonbinding fit within each groove.

29. The invention according to claim 27 wherein each external receiver body is divided transversely relative to said groove into halves, said halves cooperatively supporting at least one shaft.

30. The invention according to claim 27 wherein each groove opening upon the upper side of the carrier rail has a T-shaped cross-section, and has walls having lateral sections which support and retaining base.

31. The invention according to claim 20 wherein said workpiece support means comprises at least one support strip which can be selectively and removably inserted or snapped into each groove and which support strip extends upwardly beyond the upper side of said carrier rail.

32. The invention according to claim 20 wherein the carrier rail has a generally rectangular cross-section,
    said carrier rail further has longitudinally extending cavities; and,
    said carrier rail being further provided with at least one T-shaped groove which extends longitudinally through the carrier rail and opens upon a lower side of said carrier rail.

33. Arrangement for selectively providing either a roller table for transportation, in a horizontal plane, of typically plate-shaped workpieces, or a workpiece support table, said arrangement comprising, in cooperative combination:
    a support in the form of at least one carrier rail, said carrier rail having a longitudinal dimension and two ends;
    at least two grooves disposed longitudinally upon said carrier rail, said grooves further being disposed in parallel spaced relationship to one another, said grooves opening upon an upper side of said carrier rail, said grooves further having openings upon at least one end of said carrier rail;
    a first roller means selectively and removably insertable within said grooves so as to provide rolling transport of workpieces in a direction parallel to said carrier rail;
    a second roller means selectively and removably insertable within said grooves so as to provide rolling transport of workpieces in a direction transverse to said carrier rail;
    workpiece support means selectively and removably insertable within said grooves to provide a workpiece support table, and
    said first roller means, said second roller means and said workpiece support means being interchangeable.

34. The invention according to claim 33 wherein said second roller means comprises:
    an external receiver body having at least two retaining bases projecting downwardly therefrom and connected therewith by a web, said retaining bases slidably fitting within corresponding parallel disposed grooves in said carrier rail;
    at least two shafts supported by said external receiver body, said shafts extending parallel to said grooves; and
    at least one roller rotatably supported by each said shaft, said roller being supported, in its entirety, above the upper side of said carrier rail, some peripheral portion of said roller protruding above said external receiver.

* * * * *

UNITED STATES PATENT AND TRADEMARK OFFICE
CERTIFICATE OF CORRECTION

PATENT NO. : 4,738,345
DATED : April 19, 1988
INVENTOR(S) : Erwin Jenkner

It is certified that error appears in the above-identified patent and that said Letters Patent is hereby corrected as shown below:

Col. 3, line 21            Delete "support" and insert instead -- carrier --.

Col. 4, line 40            After "relative", insert -- to --.

Claim 2, Col. 5, line 59   Delete "hole" and insert instead -- hold --.

Claim 4, Col. 6, line 2    Delete "receivign" and insert instead -- receiving --.

Claim 11, Col. 6, line 32   Delete "latterally" and insert instead -- laterally --.

Signed and Sealed this

Ninth Day of May, 1989

*Attest:*

DONALD J. QUIGG

*Attesting Officer*          *Commissioner of Patents and Trademarks*